May 22, 1934.　　　W. P. LEAR　　　1,959,869

RADIO CONTROL DEVICE

Filed Aug. 7, 1930

Inventor:
William P. Lear
Williams, Bradbury
McCaleb & Hinkle
By
Atty's.

Patented May 22, 1934

1,959,869

UNITED STATES PATENT OFFICE 1,959,869

RADIO CONTROL DEVICE

William P. Lear, Chicago, Ill., assignor to Galvin Manufacturing Corporation, Chicago, Ill., a corporation of Illinois Application August 7, 1930, Serial No. 473,584

3 Claims. (Cl. 250—14)

This invention relates in general to radio sets or systems and has more particular reference to a novel control device for automobile radio sets or systems.

An important object of the present invention is the provision of a control attachment for vehicle radio sets so positioned in and attached to a vehicle as to be readily accessible to an operator of the vehicle.

Another important object of this invention is the provision of a novel automobile radio control device which will be adjustably attachable to the steering post or column of an automobile.

Still another important object of the invention is the provision of such a novel control device which will be so attachable to the steering post of an automobile as not to require the operator to shift from the driving position in order to manipulate the control device.

A further important object of the invention is the provision of such a control device for automobile radio sets, which will be so attachable to the steering post of an automobile as not to interfere with the safe operation of the automobile.

Another important object of the present invention is the provision of such a control device or attachment for automobile radio sets, provided with a casing having an integral portion designed to substantially enclose a novel mechanical connection between a tuning connector and an operating means therefor.

Other objects and advantages of the invention will be apparent from the following detailed description.

In automobile radio sets the control devices should be so positioned as not to require the driver of the automobile to change or shift his driving position in order to operate the radio control devices because the attention of the driver, from the standpoint of the safe operation of the automobile, is required by the automobile controls. On the other hand, such control devices should be so positioned as not to interfere with the driver's facile manipulation of the automobile controls either by forming a direct obstacle to render the automobile controls less accessible or by presenting control operating means which may be confused with the automobile controls. If, therefore, it is necessary for the driver to lean over or away from the steering mechanism of the automobile in order to operate the radio set; if the control device is so positioned as to crowd the driver or as to provide an obstacle interfering with the manipulation of the automobile controls; or if light from the control device is not so shielded as to prevent it from being projected in the driver's compartment and interfering with the driver's vision, the operation of such a set or system is an accident hazard or a menace to the safe operation of the automobile.

The present invention, therefore, briefly contemplates the provision of a control device or attachment for automobile radio sets, so positioned in the automobile as to be readily accessible to the driver without interfering with the safe operation of the automobile. This control device is provided with a plurality of electrical conductors connecting the control unit with a connector plug detachably connectible with a radio set mounted in the automobile by "plugging" the connector plug in a socket provided for this purpose on the set. The tuning of the radio set is accomplished by a tuning handle or knob on the control device, which is attached to a spindle or connecting shaft positioned in a hollow projection integral with a casing member and depending therefrom. This spindle has driving engagement with the tuning indicator dial and a flexible connector extending from the control device to the tuning means of the radio set.

Figure 1:
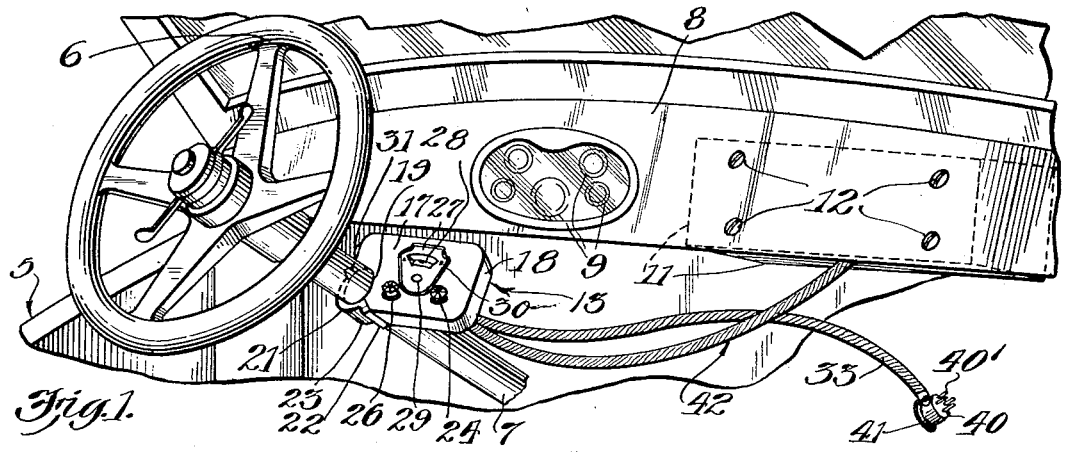
Fig. 1 is a partial, perspective view of an automobile equipped with a novel control device embodying the features of the invention.
Figure 2:
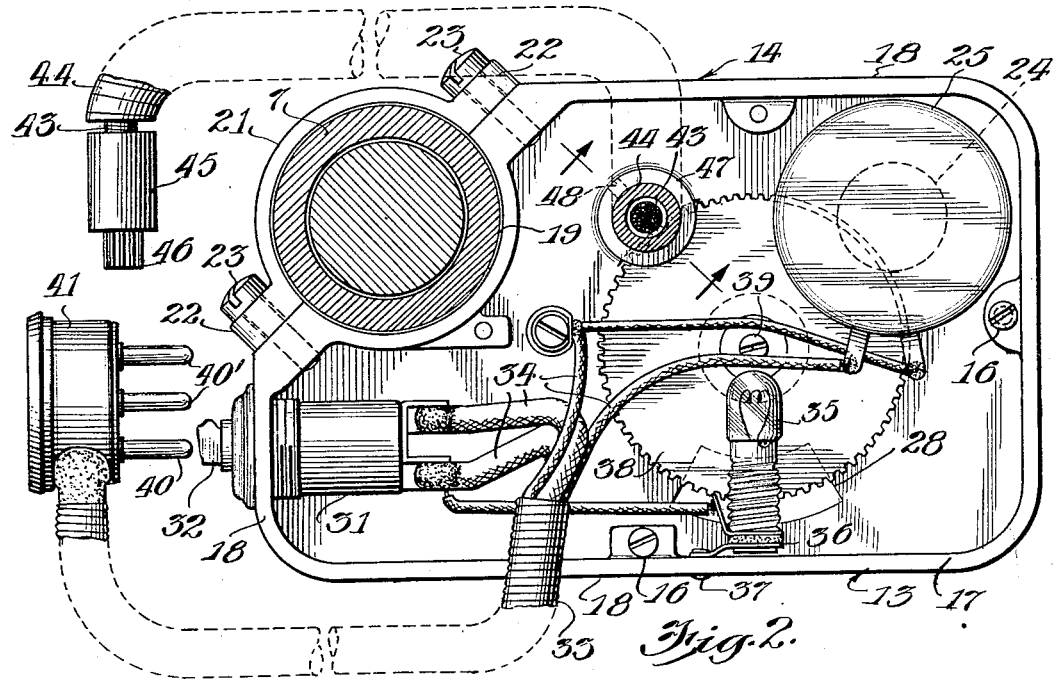
Fig. 2 is an enlarged bottom plan view of the control device of Fig. 1, showing the casing open.

Illustrative of the present invention, the drawing shows a portion of an automobile 5 provided with a usual steering mechanism 6 carried at the upper end of a steering post or column 7. The automobile 5 has a usual control panel or dashboard 8 carrying control devices 9 and a radio receiving set or system illustrated by dotted lines 11 in Fig. 1 and secured to the dashboard in any suitable manner, such as by bolts 12. It will, of course, be understood that the invention is not limited to the mounting of the radio set on the dashboard of the automobile but contemplates any usual or suitable mounting for the set, the drawing showing merely one suitable mounting.

In order to obviate the necessity of marring or redesigning the dashboard and to avoid mounting radio control devices on the dashboard which may be confused with the automobile control devices 9, I provide a control unit for the receiving set 11, the control unit being slidably attachable to the steering post 7 in such manner as to be conveniently accessible to the driver without interfering with the operation of the automobile.

The above mentioned control unit or attachment is provided with a casing 13 having a top member 14 and a bottom member or wall 17 secured to the top member by screws 16, and may be cast or otherwise suitably formed of metal. The top member 14 has integral top and side walls 17 and 18, respectively, which together with the bottom member 15 are formed to provide a recess 19 at a corner of the casing.

This recess 19 is so formed as to conform to the configuration of the steering post 7 which fits in the recess so that the casing 13 is held substantially in front of the steering post when attached thereto by a clamping or arcuate member 21 having lugs or ears 22 at opposite sides thereof and by bolts 23 through the ears 22. Such a mounting of the casing 13 permits adjustment longitudinally of the steering post and the casing may be secured at the desired height to suit the individual. Being attached to the steering post at substantially the side opposite the driver, the casing does not interfere with the driver's foot movements to operate the automobile, nor does it crowd him in the driver's seat.

The top side 17 serves as a control or instrument panel for the radio set 11 and is adapted to carry the radio operating and tuning devices of the radio set. The radio operating devices include a volume control handle or knob 24 operably connected to a suitable volume control means, such as a rheostat or voltage divider 25 suspended from the panel 17 inside of the casing 13 for the purpose of adjusting the volume of the received signal. In addition to the volume control handle 24, a tuning handle or knob 26 and an escutcheon 27 are carried on the control panel 17 for tuning the set and for finishing a dial or sight aperture 28 in the panel 17. The escutcheon 27 may be secured to the top wall 17 by any suitable means such as a screw 29 and rivets 30.

The radio set 11 may be controlled by any suitable "on and off" or control switch 31 carried by a side wall 18 adjacent the recess 19. This control switch may be of any suitable construction, it being here preferred, as illustrated, to employ a key-operated switch operable by a key 32 outside the casing 13 in order to prevent the unauthorized use of the radio set.

A cable 33 having a plurality of conductors 34 extends through an opening in the bottom member or wall 15 for connecting the radio operating and control devices in the casing 13 to the radio set 11. The conductors 34 are connected to the volume control means 25, the control switch 31, and to a dial light 35 suitably secured to a side wall 17 by means of a terminal bracket 36 and a rivet 37 for illuminating a tuning indicator dial or disc 38. The dial 38 is rotatably suspended from the top wall 17 by a screw 39 and is visible through the dial opening or aperture 28.

The other ends of the conductors 34 connect to plugs or studs 40 and 40' projecting from a connector plug 41 carried on the end of the cable 33. This connector plug is adapted to be "plugged in" a corresponding socket, not shown, on the radio set 11. The plugs or studs 40 and 40' may be so proportioned in size as to permit the use of a socket member having socket apertures of corresponding sizes to prevent improperly connecting the rheostat 25, the switch 31, and the light 35 to the radio set.

A flexible connector 42, extending between the radio set 11 and the casing 13, provides a mechanical means for operating the tuning means of the set and comprises concentrically arranged inner and outer tubes 43 and 44 extending through the bottom member or wall 15 of the casing. The tubes 43 and 44 are fashioned from a helically formed metal strip or wire and the inner tube 43 is rotatable. This tube 43 may be suitably connected to the tuning means of the radio set by means of a sleeve or drum 45 fixed at the end of the inner tube and a ratchet or pinion gear 46 carried by the sleeve or drum 45 and adapted to rotate with the tube 43 to drive the tuning means of the radio set. The sleeve or drum 45 facilitates making the connection between the connector 42 and the tuning means and is of sufficient diameter to prevent the end of the tube 43 from backing into the tube 44.

Figure 3:
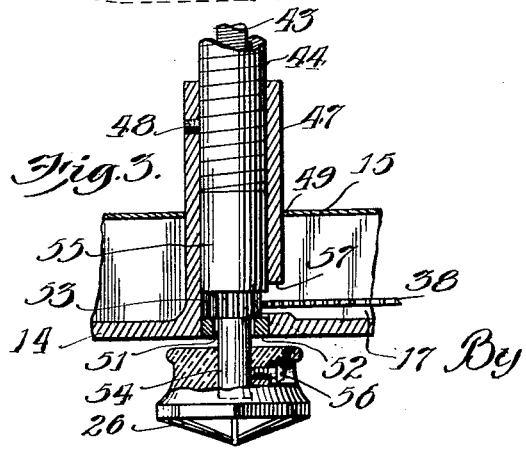
Fig. 3 is a fragmentary section taken substantially on the line 3—3 of Fig. 2, the casing being closed.

The other end of the connector 42 is held in a hollow, tubular projection or sleeve 47 integral with and depending from the top wall 17 of the casing top member by means of a retaining or set screw 48 engaging the outer tube 44 as shown more particularly in Fig. 3. This sleeve 47 extends through an aperture 49 in the bottom member 15 and is provided with a restriction 51 at its upper end which may be formed by an integral flange or shoulder about the sleeve opening or, as shown, by a ring or bushing 52 secured in the upper end of the sleeve and having an aperture therein of smaller diameter than the sleeve opening.

The ring 52 provides a bearing for a ratchet or pinion 53 intermediate the ends of a spindle 54 which is secured at its lower end to a sleeve or drum 55 similar to the sleeve or drum 45. This sleeve or drum 55 is fixed on the end of the inner tube 43 and serves as a spacer between the end of the tube 44 and the gear 53. The upper end of the spindle 54 extends through the restricted portion or aperture 51 at the upper end of the sleeve 47 and carries the tuning knob or handle 26 secured thereto by a set screw 56 in a well known manner to actuate the tuning operating means of the radio set. It will be observed that the sleeve 55 serves as a thrust bearing for the inner tube 43 against the tube 44, and that the sleeve 47 substantially encloses the connection between the flexible connector 42 and the spindle 54.

The depending sleeve 47 has an aperture or slot 57 adjacent its upper end. The dial 38 extends into this sleeve through the aperture and engages the ratchet 53 which rotates as the handle 26 is operated to tune the set. Thus the operation of the handle 26 tunes the radio set and drives the tuning indicating means or dial 38 which indicates the tuned condition of the set.

Thus, a remote control attachment or unit may be clamped to the steering post of an automobile and adjustably positioned longitudinally of the post to accommodate the requirements of various drivers as to the height of the unit. Being on the steering post, the control attachment is readily accessible to the driver and does not necessitate his shifting from the driving position in order to manipulate the control and operating devices carried by the control unit. On the other hand, the casing, being mounted substantially in front of the steering post and providing a bottom member to shield the light required to illuminate the dial, does not crowd the driver or interfere with his operating the automobile foot controls and does not affect his vision by extra light projected from the control unit into the driver's compartment.

As described, the radio operating and control devices are detachably connectible to the radio receiving set, thereby facilitating the installation of the radio set and permitting the control unit to be replaced by another similar unit or attached to a different automobile for the control of another radio set. The connection of the mechanical tuning connector to a spindle actuated by a control handle directly connected thereto and driving the tuning indicator is an important feature of the present invention. Attention is again, therefore, directed to the sleeve integral with the casing and embracing a portion of the connector and substantially enclosing the connection between the spindle and the mechanical connector. The enclosing sleeve provides rigidity for the connection between the flexible connector and the short spindle.

While I have illustrated and described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim and desire to secure by United States Letters Patent is:

1. A control unit for automobile radio sets comprising a casing having separable top and bottom members, radio operating and control devices carried by said top member, tuning operating means extending through said bottom member, and actuating means extending through said top member and connected with said operating means in said casing, and a depending sleeve integral with said top member and extending through said bottom member, said sleeve enclosing the connection between said operating and actuating means.

2. A control unit for automobile radio sets comprising a casing, radio operating and control devices in said casing, tuning operating means extending through said casing and having an operating handle outside of said casing, a depending sleeve integral with said casing embracing a portion of said actuating means, and a tuning indicator having driving engagement with said operating means in said sleeve.

3. A control unit attachable to the steering post of an automobile for use with automobile radio sets, comprising a casing having separable top and bottom members, said top member having an integral sleeve extending through said bottom member, and tuning operating means including a handle on said top member, a spindle connected thereto and removably positioned in said sleeve, and a flexible connector operably secured to said spindle in said sleeve, and connected to a radio set.

WILLIAM P. LEAR.